(12) United States Patent
Muller

(10) Patent No.: US 9,476,326 B2
(45) Date of Patent: Oct. 25, 2016

(54) SYSTEM AND METHOD FOR GENERATING ELECTRICAL POWER

(71) Applicant: Thomas R. Muller, Manorville, NY (US)

(72) Inventor: Thomas R. Muller, Manorville, NY (US)

( * ) Notice: Subject to any disclaimer, the term of this patent is extended or adjusted under 35 U.S.C. 154(b) by 429 days.

(21) Appl. No.: 14/215,256

(22) Filed: Mar. 17, 2014

(65) Prior Publication Data

US 2014/0265350 A1     Sep. 18, 2014

Related U.S. Application Data

(60) Provisional application No. 61/790,426, filed on Mar. 15, 2013, provisional application No. 61/807,094, filed on Apr. 1, 2013.

(51) Int. Cl.
| | |
|---|---|
| *F01K 13/00* | (2006.01) |
| *F23G 5/033* | (2006.01) |
| *F23G 7/10* | (2006.01) |
| *F23G 5/46* | (2006.01) |

(52) U.S. Cl.
CPC .............. *F01K 13/00* (2013.01); *F23G 5/033* (2013.01); *F23G 5/46* (2013.01); *F23G 7/105* (2013.01); *F23G 2201/602* (2013.01); *F23G 2201/80* (2013.01); *F23G 2206/203* (2013.01); *Y02E 20/12* (2013.01)

(58) Field of Classification Search
CPC .......... F01K 13/00; F23G 5/033; F23G 5/46; F23G 7/105; F23G 2201/602; F23G 2201/80; F23G 2206/203; Y02E 20/12
USPC .......................................... 60/645, 670, 672
See application file for complete search history.

(56) References Cited

U.S. PATENT DOCUMENTS

| | | | |
|---|---|---|---|
| 3,783,725 A | 1/1974 | Payeur | |
| 3,945,315 A | 3/1976 | Dahlem et al. | |
| 4,123,489 A | 10/1978 | Kelley | |
| 6,871,604 B2 | 3/2005 | Alexakis et al. | |
| 8,201,767 B2 | 6/2012 | Wright | |
| 2009/0000184 A1* | 1/2009 | Garwood | B01F 7/00875 44/307 |
| 2009/0020456 A1* | 1/2009 | Tsangaris | C10G 2/30 208/133 |
| 2009/0291403 A1* | 11/2009 | Conti | F23K 3/02 431/346 |
| 2011/0203170 A1 | 8/2011 | Quaranta | |
| 2011/0262985 A1* | 10/2011 | Medoff | C10L 5/44 435/165 |
| 2012/0124901 A1 | 5/2012 | Paoluccio | |
| 2014/0163664 A1* | 6/2014 | Goldsmith | A61B 17/00491 623/1.11 |

* cited by examiner

*Primary Examiner* — Audrey K Bradley
*Assistant Examiner* — Dapinder Singh
(74) *Attorney, Agent, or Firm* — Carter, DeLuca, Farrell & Schmidt, LLP; Joseph W. Schmidt

(57) ABSTRACT

A system for generating electrical power, including a frame defining a vertical axis and a horizontal axis, and having a support base generally extending along the longitudinal axis. The support base has an input end and an output end. At least a first shear station includes a first shearing blade adapted to reciprocate in a vertical direction between a first displaced position displaced from the support base and a second approximated position proximate the support base to shear the tree waste supported by the support base. An index blade is adapted for at least general horizontal movement along the support base. The index blade is dimensioned and adapted to direct the sheared tree waste toward the output end of the support base. A pulverizing station receives the sheared tree waste directed through the output end of the support base. The pulverizing station includes a pulverizing member actuable to pulverize the sheared tree waste. A furnace receives and converts the pulverized tree waste into steam energy. A steam generator turbine converts the steam energy into electricity.

17 Claims, 4 Drawing Sheets

SYSTEM AND METHOD FOR GENERATING ELECTRICAL POWER

CROSS REFERENCE TO RELATED APPLICATION

This application claims priority to, and the benefit of, U.S. Provisional Application Ser. No. 61/790,426, filed Mar. 15, 2013 and U.S. Provisional Application Ser. No. 61/807,094, filed Apr. 1, 2013, the entire contents of which are being hereby incorporated by reference herein.

BACKGROUND

1. Technical Field

The present disclosure relates to a system and associated methodology for generating electrical power from tree waste products.

2. Description of Related Art

In recent years, a major focus has been placed on tapping renewable energy sources to reduce and phase out our dependence on fossil fuels. There have been new technologies developed for using hydro, solar, and wind sources for adding renewable energy to our electrical power grid systems. Tree wood is another renewable energy resource that has yet to realize its full potential for generating electricity on a regular basis. Since a cord of typical hardwood contains 28 million BTU's of heat, or the equivalent of 200 gallons of fuel oil, it may be desirable to harness the huge fuel supply that comes to, e.g., municipalities in the form of tree waste. Some sources also indicate that efficient burning of wood produces no more pollutants than natural decay.

Many municipalities have a major problem with the disposal of brush, limbs, logs, and stumps as they are brought into the landfill and dumping sites. The tonnage of tree debris directed into municipalities is staggering, and may be further increased in the event of extreme weather including storms, hurricanes etc. This tree material is typically shredded in commercially available machines, if the diameter and length of the wood sections that are fed to them are small enough to be continuously "digested" in the spinning machines. The shredded or chipped product will then yield a volume reduction of close to 20 to 1. Thus, on a volume basis alone, most municipalities would consider their "disposal problem" solved if every 20 truck loads of tree wood waste could be economically and continuously reduced to one truck load of wood shreds to be "disposed". The challenge for continuously shredding the incoming wood debris is, of course, the need for "sectioning" this material into pieces whereby the maximum size piece would be no larger than a typical piece of firewood (e.g., 20"×6" diameter or other dimensions), and with no limits on sizes for smaller pieces. Currently, there are no systems with saws or machines capable of cutting this incoming (soil and even nail saturated) wood material into the necessary sections for economic shredding on a continuous basis. Most municipality disposal sites, as well as private composting establishments, still utilize multiple pay-loaders, excavator mounted scissor shears, trailer mounted "tub grinders", multiple conveyor systems and laborers to turn the material into a mulch-able output product that achieves the volume reduction.

SUMMARY

Accordingly, the present disclosure is directed to a system for generating electrical power from tree waste products for consumer end use. The system includes a frame defining a vertical axis and a horizontal axis, and having a support base generally extending along the horizontal axis. The support base has an input end and an output end. At least a first shear station includes a first shearing blade adapted to reciprocate in a vertical direction between a first displaced position displaced from the support base and a second approximated position proximate the support base to shear the tree waste supported by the support base. An index blade is adapted for at least general horizontal movement along the support base. The index blade is dimensioned and adapted to direct the sheared tree waste toward the output end of the support base. A pulverizing station receives the sheared tree waste directed through the output end of the support base. The pulverizing station includes a pulverizing member actuable to pulverize the sheared tree waste. A furnace receives and converts the pulverized tree waste into steam energy. A steam generator turbine converts the steam energy into electricity.

In one embodiment, a second shear station is disposed between the first shear station and the output end of the support base, and is positioned to receive the sheared tree waste from the first shear station. The second shear station includes a second shearing blade adapted to reciprocate in a vertical direction between a first displaced position displaced from the support base and a second approximated position proximate the support base to further shear the sheared tree waste.

The second shearing blade is arranged rotationally offset relative to the first shearing blade of the first shearing blade. In one embodiment, the second shearing blade is offset relative to the first shearing blade at an angle of about 90 degrees.

A third shear station may be disposed between the second shear station and the output end of the support base. The third shearing blade is positioned to receive the sheared tree waste from the second shear station. The third shear station includes at least a third shearing blade. The third shearing blade is adapted to reciprocate in a vertical direction between a displaced position displaced from the support base and a second approximated position proximate the support base to further shear the sheared tree waste. The third shear station may include at least two third shearing blades. The third shearing blade also arranged rotationally offset relative to the first shearing blade of the first shearing blade. The third shearing blade may be offset relative to the first shearing blade at an angle of about 90 degrees.

The shearing blade may be spaced a predetermined distance from the support base when in the approximated position. The indexing blade also may be adapted for vertical movement along the shearing blade to facilitate removal of tree waste from the surface of the shearing blade, break smaller twigs and vines and facilitate positioning between shear stations.

The system may include a screening stage adjacent the output end of the support base. The screening stage includes a screen dimensioned to remove mulch byproduct from the sheared tree waste for direction to a mulch output. The index blade may be adapted for horizontal traversing at least partially across the screen of the screening stage.

At least the first shearing blade may include coolant passages for permitting transfer of fluids for cooling the first shearing blade. A source of fluids is in fluid communication with the coolant passages of the first shearing blade. A fluid passage may be in fluid communication with the coolant passages of the shearing blade for receiving the fluids passing though the coolant passages and directing the fluids to the pulverized tree waste before, during or subsequent introduction of the pulverized tree waste into the furnace.

As one option, the system may include a magnet station adjacent the output end of the support base for removing metallic material from the sheared tree waste. Another option includes a wood chip separator, which is disposed between the output end of the support base and the pulverizing station. The wood chip separator is adapted to permit passage of wood chips of sheared tree waste having a minimum dimension.

The system shears the material, hammer-mills into shreds, produces steam in a furnace, spins windmill generators and feeds electricity back to an electrical grid. The system may include a "fixed plant" enclosed by a sound insulated steel-panel building for the purpose of shredding the entire brush, limb, log and stump input of one or more towns on a continuous basis in all weather conditions. The system performs shearing or sectioning operation, which then releases a soil/bark/leaf mulch byproduct when the sheared material is wiped over a screen grid. The system is firmly based on simplicity and durability in its concept. The complete system would yield five usable output products and one waste (that being the controlled exhaust from the efficient shred furnace operation). The output products include: soil/bark/leaf (mulch) by-product, wood shreds, wood chips, pure wood ash (fertilizer & mulch ingredients), and output grid electricity. Full plant operation would yield only the mulch bi-product, clean wood ash, and grid electricity.

The actual "reducing" of the sectioned (sheared) wood pieces into shreds, may be done with hammer mills rather than chippers, since the sectioned pieces will still have some soil and stone imbedded in them after shearing. Wood chippers all have sharp tool steel cutting edges, which will dull with the introduction of sand and other abrasive particles. Hammer mills in a continuous feed system, produce consistent shreds of a particular size range with virtually no regard of soil presence. Hammer mill "grates" can be changed in order to obtain different gradations of shred parameters from the same machine and drive system.

A permanent enclosed facility as opposed to outdoor trailer mounted components is also contemplated. The plant machinery may be fabricated in "units", delivered on flatbed trailers, and assembled on site. Advantages of the enclosed facility include: safety and theft protection, gravity use for the transfer of wood product stages, extreme durability and strength of vital machinery parts, all weather operational capability, hi-volume of daily input, low manual labor requirement, and the wood shred product will transfer continuously and directly into the bio-mass steam boilers that power the electric generators. The bulk of the resultant electricity will be sold back to the local power company during operations.

The system may be built on a site and require only a pay-loader to feed it. The brush and stump material, after being sheared into smaller sections, may then be wiped over a commercially available large metal screen to drop out and release the soil/bark/leaf mulch bi-product. There may be magnet stations used to pull out ferrous contaminants and the remaining wood product then slides down the metal ramp into the mouth of the spinning hammer mill for creation of the wood shred boiler fuel. Since it is a goal of this plant designs to process truckloads at the same rate as they normally enter the disposal site, it is recommended to have two or more hammer mills installed. With large hydraulic gates, it is then possible to direct the wood product into one hammer mill while maintenance is performed on the other. A wood chipper could be incorporated and used, with a sorted log input, to yield quality wood chips from the plant. There may be an alternate process (and boiler input) for the efficient screening and burning of the wood chips provided from the loads of tree service wood chips.

BRIEF DESCRIPTION OF THE PREFERRED EMBODIMENT(S)

Preferred embodiments of the present disclosure will be appreciated by reference to the drawings wherein.

DETAILED DESCRIPTION OF THE PREFERRED EMBODIMENTS

Figure 1:
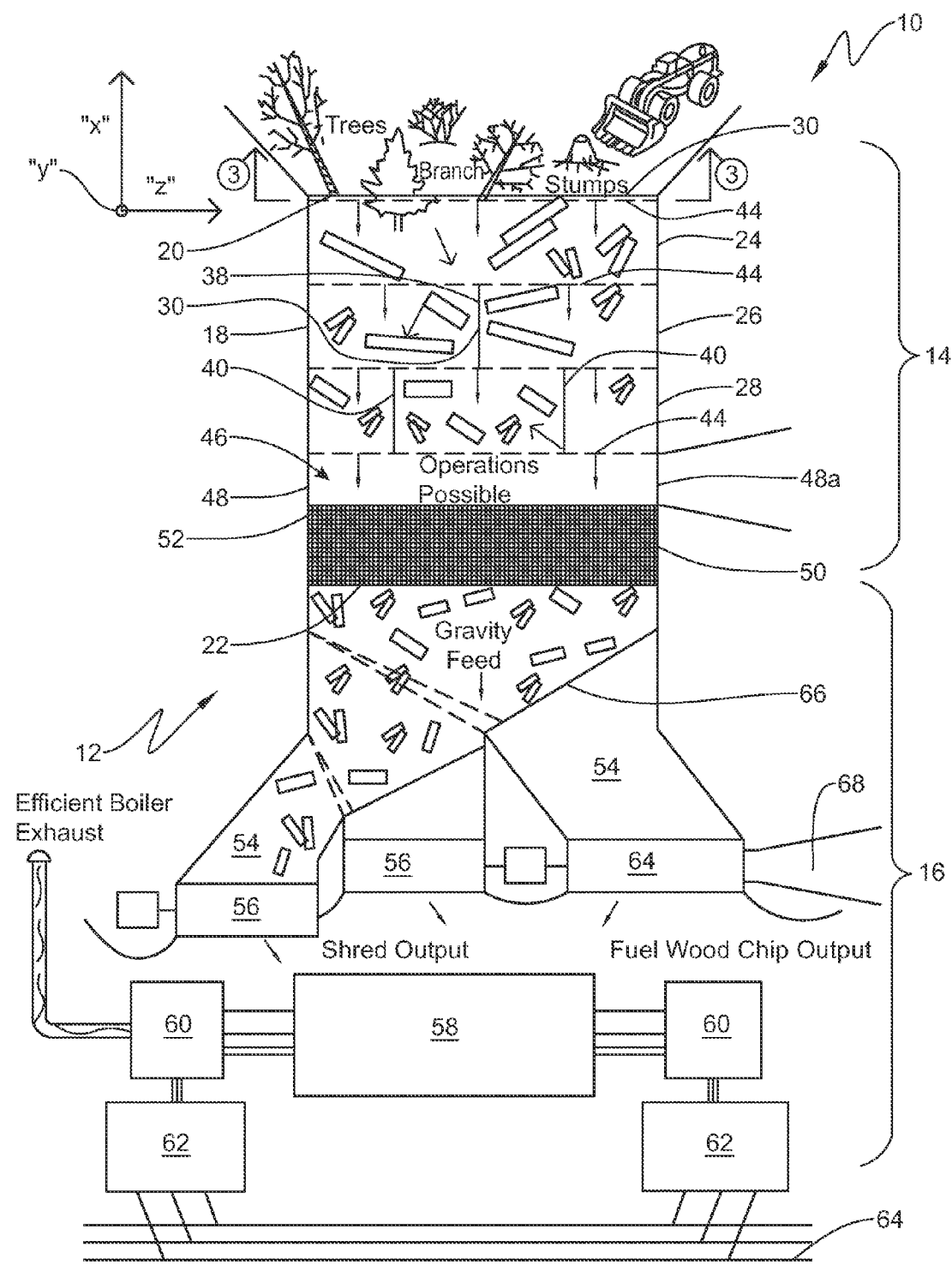
FIG. 1 is a schematic diagram of the system for generating electrical power in accordance with the principles of the present disclosure.
Figure 2:
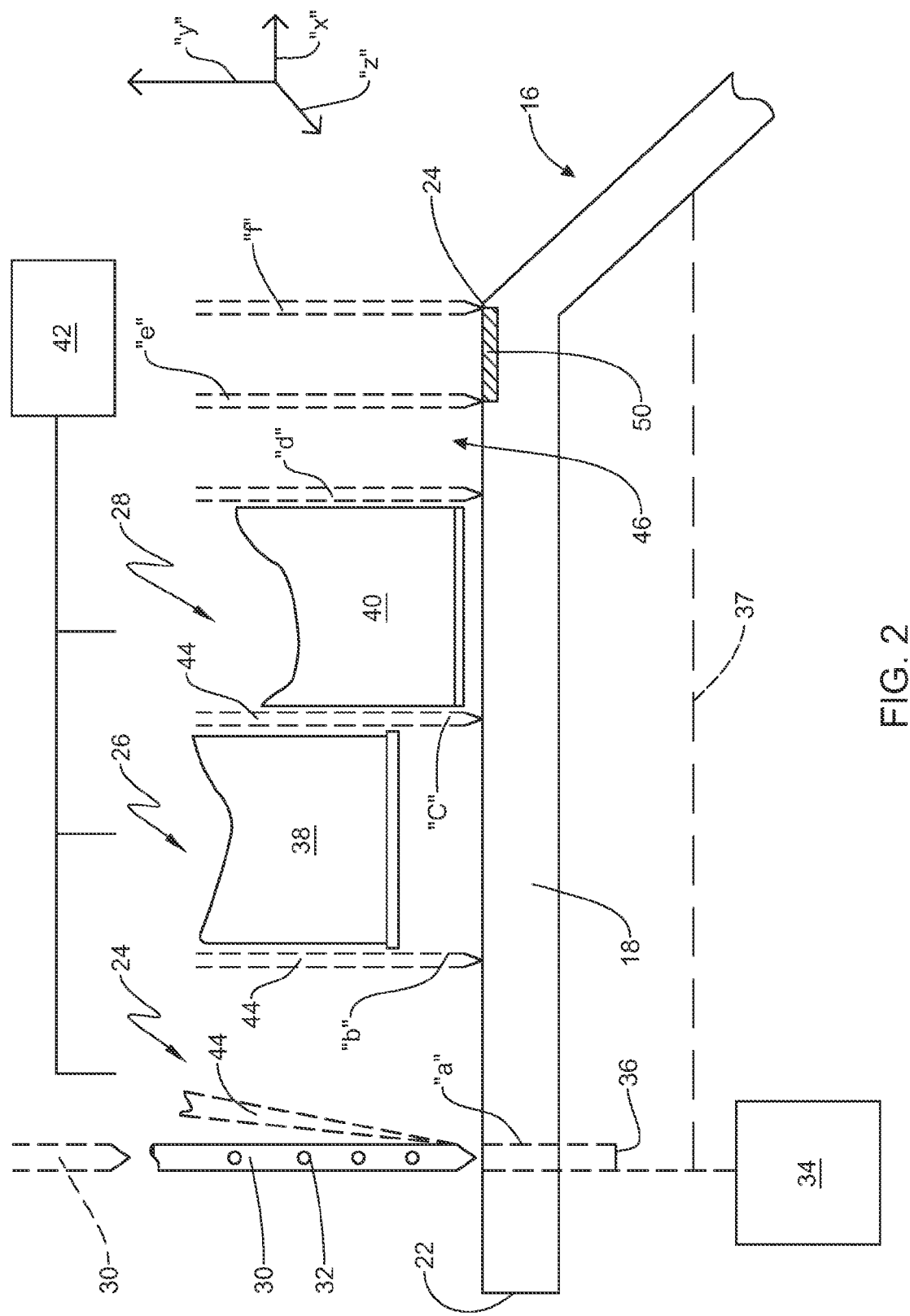
FIG. 2 is a side schematic view of the shearing section of the system.

Referring now to FIGS. 1-2, there is schematically illustrated the system in accordance with the principles of the present disclosure for shearing and pulverizing wood waste, particularly, tree wood waste, and converting the byproduct into electrical power. The system 10 generally includes a housing, facility or frame 12, a shearing section 14 and an output section 16 in line with the shearing section 12. The housing or frame 12 may be a permanent or temporary structure, and may be ambulatory. For reference, the frame 12 defines a horizontal axis "x", a vertical axis "y", and an orthogonal axis "z". The shearing section 14 has a support base or bottom 18 which generally extends along the horizontal axis "x" and defines an input end 20 and an output end 22 adjacent the output section 16 of the system 10. The support base 18 may be made of cement or any other durable material capable of absorbing significant force during operation of the shearing section 14.

In general, the shearing section 14 provides the initial shearing functions on the tree waste to produce "sheared tree waste". The output section 16 receives the "sheared tree waste", and further cuts or pulverizes the sheared tree waste to form "pulverized tree waste" which is eventually burned and converted to useable electrical power.

In the schematic of FIG. 1, the shearing section 14 is depicted vertically above the output section 16. This depiction, however, is only intended to clarify the features of the disclosure. The support base 18 of the shearing section 14 generally runs horizontally, e.g., parallel to the earth or ground. The output section 16 is typically located beneath the shearing section 14 to receive the "sheared tree waste" via gravity for subsequent pulverizing and treatment; however, it is envisioned that the output section 16 could be at the same vertical level or above the shearing section 14 whereby the "sheared tree waste" could be directed to the output section 16 via automation, conveyors or the like. In FIG. 2, the output section 16 is shown depending downwardly from the shearing section 14.

With reference now to the FIGS. 1-4, the shearing section 14 includes a plurality of shear stations, e.g., first, second and third shear stations 24, 26, 28. The first shear station 24 is disposed adjacent the input end 20 of the support base 18.

The first shear station 24 includes a first shearing blade 30 which is adapted to reciprocate in a vertical direction along axis "y" between a first displaced position (shown in phantom in FIG. 2) displaced from the support base 18 and a second approximated position proximate the support base 18. As depicted, the first shearing blade 30 is angularly oriented to extend along the orthogonal z-axis, e.g., across the width of the support base 18. The first shearing blade 30 is dimensioned to perform the initial cut or shear on the tree waste to cut the tree waste to a first general length and dimension. In embodiments, the first shearing blade is about at least 12 feet in length. The tree waste may range in length up to twelve (12) feet in length after being treated by the first shear station 24. The first blade 30 may be fabricated from any suitable metal and may have a tapered end, which shears the tree wood.

Figure 3:
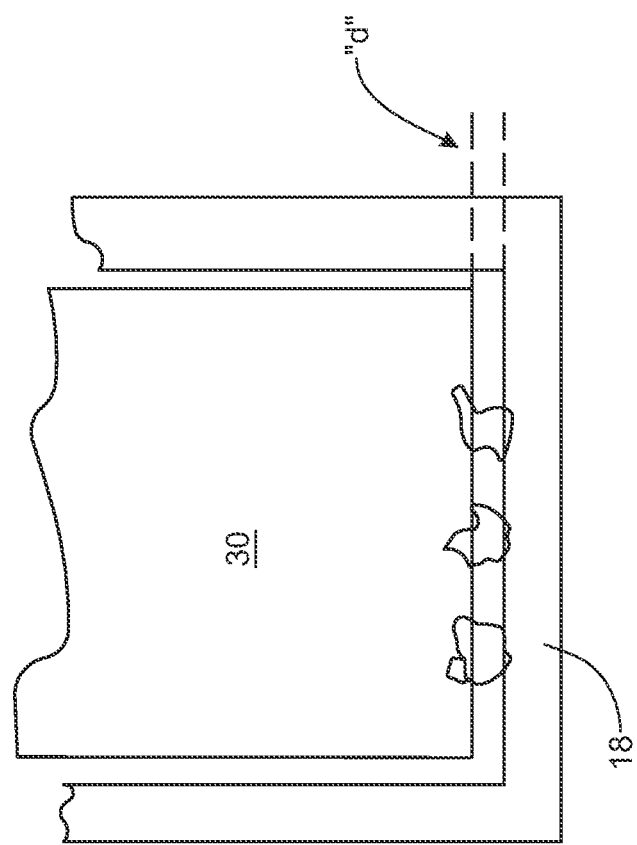
FIG. 3 is a cross-sectional view taken along the lines 3-3 of FIG. 1 illustrating the first shearing blade of the first shear station.

In FIG. 3, the first shearing blade 30 is shown in the fully approximated position. In the approximated position, the edge of the blade 30 is displaced from the support base 18, by a distance "d", e.g., of about 0.125 inches or less, the significance of which will be discussed hereinbelow.

Figure 4:
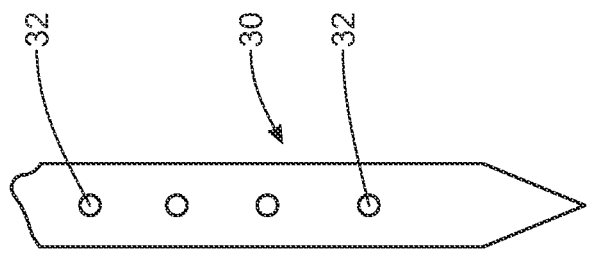
FIG. 4 is a side plan view of the first shearing blade.

As depicted in FIG. 4, the first shearing blade 30 includes a plurality of cooling tubes or apertures 32 which are in fluid communication with a source of coolant 34 (FIG. 2) fluid through conduit 36. The coolant fluid is passed through the first shearing blade 30 during operation to cool the blades, and then directed to the output section 16 of the system 10 (schematically depicted as numeral 37 in FIG. 2) for subsequent use. Any conduit or tubing arrangement may be incorporated for transferring the coolant from the shearing section 14 to the outlet section 16 subsequent to passage through the blades 30. The fluid directed to the output section 16 is heated as a result of the shearing process. The heated coolant may be utilized to increase burning efficiency of the tree waste.

The second shear station 26 is disposed adjacent the first shear station 24 and includes a second shearing blade 38. The second shearing blade 38 is angularly offset relative to the first shearing blade, e.g., rotated about axis "y" about 90 degrees to generally extend along the horizontal axis "x" of the support base 18 whereby the second shearing blade 38 is substantially orthogonal to the first shearing blade 30. The second shearing blade 32 is dimensioned to perform an additional cross cut or shear on the tree waste to further cut the tree waste to a second general length and dimension, which is smaller than the first length and dimension of the first shear station 24. In embodiments, the tree waste may range in length up to six (6) feet in length after being treated by the second shear station 26. The second shearing blade 32 is about 30 inches in length, and may include cooling apertures 32.

The third shear station 28 is disposed adjacent the second shear station 26 and includes at least one third shearing blade 40. In embodiments, the third shear station 28 includes two of the third shearing blades 40. The two third shearing blades 40 also are each angularly offset relative to the first shearing blade, e.g., rotated about axis "y" about 90 degrees to generally extend along horizontal axis "x" of the support base 18. The third shearing blades 40 are dimensioned to perform an additional cross cut or shear on the tree waste to further cut the tree waste to a third dimension, which is less than the second dimension of the second shear station. In embodiments, the tree waste may range in length up to three (3) feet in length after being treated by the third shear station.

Each of the first, second and third shearing blades 30, 38, 40 may be actuated through any drive system 42 including hydraulic or other mechanical means including cam-drive systems. The drive system 42 may be adapted to simultaneously activate, sequentially activate and/or independently activate the first, second and third shearing blades 30, 38, 40. The drive system 42 may include computer software or logic to activate each of the first, second and third shearing blades 30, 38, 40 in accordance with one or more stored programs. The drive system 42 may include force sensors or the like to monitor extreme forces exerted on any of the blades 30, 38, 40 and automatically control the blades in accordance with a safety protocol embedded in the computer logic.

With reference again to FIGS. 1, 2 and FIGS. 5A-5C, the shearing section 12 further includes one or more indexing blades 44. In one embodiment, one indexing blade 44 is provided. The indexing blade 44 is adapted to move along the horizontal axis "x" along the base segment 18 to direct the sheared tree waste between the first, second and third shear stations 24, 26, 28. In one embodiment, the index blade is also movable in a vertical direction to clear the sheared tree waste and be positioned relative to any of the shear stations 24, 26, 28. The indexing blade 44 may be actuated by the drive system 42 identified in connection with the first, second and third shearing blades 30, 38, 40 or may be separately operated by another drive mechanism.

Figure 5C:
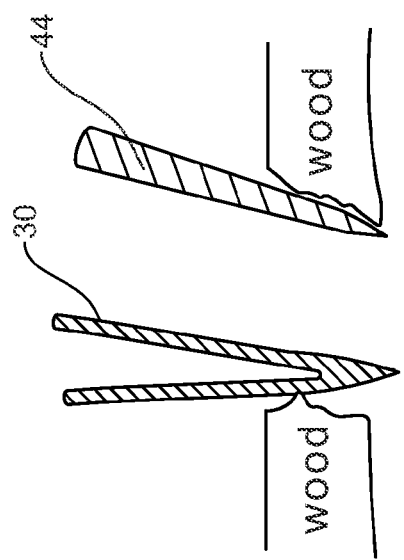
FIG. 5A-5C are views illustrating operation of the index blade.
Figure 5B:
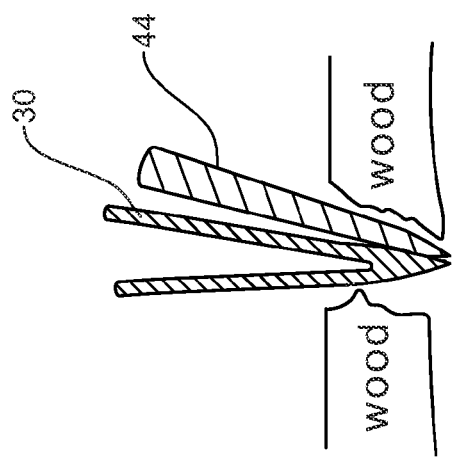
Figure 5A:
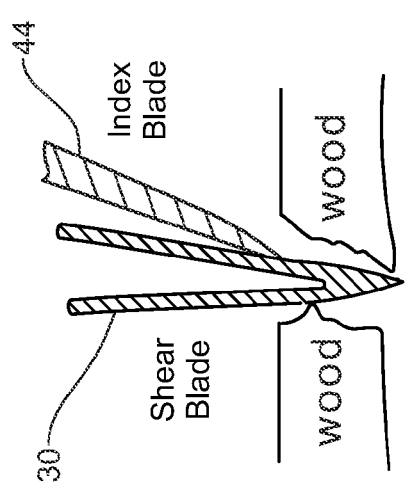

FIGS. 2 and 5A-5C illustrate operation of the index blade 44. The index blade 44 is positioned to contact the first shearing blade 30 and slide down the shearing blade 30, i.e., move in the vertical direction until the blade edge is proximate or in contacting relation with the support base 18. In one embodiment, the index blade 44 is moved in the vertical direction with a relative high downward force to sever vines, twigs or the like not severed by the first shearing blade 30. Thereafter, the pressure is reduced and the index blade 44 is moved along the horizontal axis "x" to move the sheared tree waste to the subsequent shear station, e.g., the second shear station 26. Subsequent to treatment at the second shear station 26, the index blade 44 may be further moved along the horizontal axis "x" to a location adjacent the third shear station 28 to move the sheared tree waste within the third shear station 28 for subsequent treatment. FIG. 2 illustrates the index blade 44 at positions "a", "b", "c" corresponding to locations within the first, second and third shear stations. As depicted in FIG. 5A, the index blade 44 may initially swing or come in at an oblique angle against the first shearing blade 30, which facilitates positioning and displacement relative to the first shearing blade 30.

The system 10 also may include an electromagnet station 46 after the third shear station 28. The electromagnetic station 46 would include a screen or filter and associated magnetically charged element to remove metallic material from the sheared tree waste as the index blade 44 moves across the electromagnetic station 46 from location "d" to location "e". An outlet 48 (FIG. 1) for removing the metallic material from the treatment process is also envisioned.

The system 10 also may include a screen station 50 having a screen dimensioned to remove wood by product, e.g., soil, bark, leaf, and/or mulch byproduct, from the sheared tree waste, which are small in dimension, e.g., less than the third dimension of the tree waste. In one embodiment, the index blade 44 is dimensioned to traverse the screen station 50 such that the small wood by-product passes a screen outlet 52 for removal from the system 10. The sheared tree waste not removed is directed toward the outlet end 24 of the support base 18 for eventual transfer to the output section 16 of the system. FIG. 2 illustrates the index blade 44 traversing the screen station 50 from location "e" to location "f".

The system may include a supplemental wood inlet 48a adjacent the electromagnetic station 48 for direction to the output section 16. The wood inlet 48a is adapted to receive small wood particles for supplemental feeding to the output section 16.

Referring again to FIGS. 1 and 2, the output section 16 of the system 10 will be discussed. The output section 16 may include at least one downward chute 54 leading to at least one hammer mill 56, a furnace 58, at least one steam turbine 60 and at least one windmill generator 62. In embodiments, the output section 16 includes two chutes 54, two hammer mills 56, two steam turbines 60 and two windmill generators 62. The hammer mills 56 may be any conventional hammer mill adapted to break down, cut and/or pulverize the sheared tree waste for feeding into the furnace 58. In the alternative, or additionally, the sheared tree waste may be directed to a wood chipper 64 through gate 66 (e.g., a hydraulic gate) to further cut the sheared tree waste. The chipped wood may be directed to a chipper outlet 68 for subsequent sale or use, or for direction to the furnace 58.

The furnace 58 may be any conventional industrial furnace adapted to burn the pulverized tree waste into heat and generate steam. The steam is then utilized to activate the steam turbine 60 and windmill generator 62 and produce electricity 64 to be consumed by an end consumer.

The use of the system 10 will now be discussed. Initially tree waste is brought into the facility through transport vehicles including trucks, pay loaders, cargo trains or the like. The tree waste is introduced within the input end 22 of the support base 18. The first shearing blade 30 of the first shear station 24 is activated which causes the first shearing blade 30 to move downward along the vertical axis from the displaced position to the approximated position to sever the tree waste. Due to the configuration of the blade 30 and its cooperation with the support base 18, the first shearing blade 30 will shear limbs/logs/stumps greater than 1 inch in diameter in that the tensile strength of the unsheared fibers at that point are less than the wedge forces from the thickness of the shearing blade 30 trying to pop the item into two sections. The popping that takes place (when the shear point is reached) causes the embedded and attached soil particles to explode of the wood sections while causing separation of the wood waste. It is noted that separation of the wood waste is effected without the first shearing blade 30 contacting the support base 18. The shearing blade 30 is fixed in the approximated position. Thereafter, the index blade 44 is activated whereby the index blade 44 slides down the first shearing blade 30 to remove wood material therefrom and contacts the support base 18 in the manner described hereinabove. In one embodiment, high pressure is applied to the index blade 44 for a few seconds during initial downward movement to sever twigs and vines, and then low pressure is applied to the index blade 44 during subsequent downward movement to contact the support base 18 without damaging the blade 44 or the support base 18. The drive system 42 may be adapted to control the index blade 44 in this manner. The index plate 44 is then moved along the horizontal axis "x" from location "a" to location "b" adjacent the second shear station 26. The index plate 44 is maintained in the down position contacting the support base 18. Thereafter, the second shearing blade 38 of the second shear station 26 is activated to sever the wood in a similar manner to that discussed hereinabove in connection with the first shearing blade 30 but at a ninety degree orientation relative to the first shearing blade 30. During movement of the second shearing blade 38 toward the approximated position, the index blade 44, in its down position, supports and retains the tree wood within the second shear station 26.

The second shearing blade 38 is moved vertically along the vertical axis "y", and the index blade 44 is advanced along the horizontal axis to location "c" adjacent the third shear station 28 thereby directing the tree wood waste into the third shear station 28. With the index blade 44 in it's down position, the third shearing blades 44 of the third shear station 28 are activated to further shear the tree wood waste.

The process is continued by advancing the index blade 44 along the support base 18 to cross over the magnetic station 46 and then the screen station 50 (through locations "d", "e", "f") to respectively remove metallic materials and residual tree waste from the sheared tree wood. The remaining sheared tree wood is directed into the output section 16 where it enters the hammer mills 56 for total transformation into specific and complete gradation into wood shred parameters. In the alternative, or additionally, the gate 66 leading to the wood chipper 64 may be opened to receive specific sheared tree wood for passage through the wood chipper 64. The pulverized tree waste passing through the hammer mills 56 is then directed into the furnace 58. Either prior to, simultaneous therewith or subsequent to entering the furnace 58, the heated fluid from the shearing section 14 passing through the coolant apertures 32 of the first shearing blade 30 is applied to the tree wood waste to maximize burning efficiency in the furnace 58. The furnace 58 generates steam for activating the steam turbine 60 and the windmill generator 62, which creates electricity 64 for consumer use.

While the above description contains many specifics, these specifics should not be construed as limitations on the scope of the present disclosure, but merely as exemplifications of embodiments thereof. It is envisioned that the elements and features illustrated or described in connection with one exemplary embodiment may be combined with the elements and features of another exemplary embodiment without departing from the scope of the present disclosure, and that such modifications and variations are also intended to be included within the scope of the present disclosure. Those skilled in the art will envision many other possible variations that are within the scope and spirit of the present disclosure.

What is claimed is:

1. A system for generating electrical power, which comprises:
   a frame defining a vertical axis and a horizontal axis, and having a support base generally extending along the longitudinal axis, the support base having an input end and an output end;
   at least a first shear station including a first shearing blade adapted to reciprocate in a vertical direction between a first displaced position displaced from the support base and a second approximated position proximate the support base to shear the tree waste supported by the support base; and
   an index blade adapted for at least general horizontal movement along the support base, the index blade dimensioned and adapted to direct the sheared tree waste toward the output end of the support base;
   a pulverizing station for receiving the sheared tree waste directed through the output end of the support base, the pulverizing station including a pulverizing member actuable to pulverize the sheared tree waste;
   a furnace for receiving and converting the pulverized tree waste into steam energy; and
   a steam generator turbine for converting the steam energy into electricity.

2. The system according to claim 1 including a second shear station disposed between the first shear station and the output end of the support base, and positioned to receive the sheared tree waste from the first shear station, the second shear station including a second shearing blade adapted to reciprocate in a vertical direction between a first displaced position displaced from the support base and a second approximated position proximate the support base to further shear the sheared tree waste.

3. The system according to claim 2 wherein the second shearing blade is radially offset relative to the first shearing blade of the first shearing blade.

4. The system according to claim 3 wherein the second shearing blade is radially offset relative to the first shearing blade at an angle of about 90 degrees.

5. The system according to claim 3 including a third shear station disposed between the second shear station and the output end of the support base, and positioned to receive the sheared tree waste from the second shear station, the third shear station including at least a third shearing blade, the third shearing blade adapted to reciprocate in a vertical direction between a displaced position displaced from the support base and a second approximated position proximate the support base to further shear the sheared tree waste.

6. The system according to claim 5 wherein the third shear station includes at least two third shearing blades.

7. The system according to claim 5 wherein the third shearing blade is radially offset relative to the first shearing blade of the first shearing blade.

8. The system according to claim 6 wherein the third shearing blade is radially offset relative to the first shearing blade at an angle of about 90 degrees.

9. The system according to claim 1 wherein the shearing blade is spaced a predetermined distance from the support base when in the approximated position.

10. The system according to claim 1 wherein the indexing blade is adapted for vertical movement along the shearing blade.

11. The system according to claim 1 including a screening stage adjacent the output end of the support base, the screening stage including a screen dimensioned to remove mulch byproduct from the sheared tree waste for direction to a mulch output.

12. The system according to claim 11 wherein the index blade is adapted for horizontal traversing at least partially across the screen of the screening stage.

13. The system according to claim 1 wherein the first shearing blade includes coolant passages for permitting transfer of fluids for cooling the first shearing blade.

14. The system according to claim 13 including a source of fluids in fluid communication with the coolant passages of the first shearing blade.

15. The system according to claim 14 including a fluid passage in fluid communication with the coolant passages of the shearing blade for receiving the fluids passing though the coolant passages and directing the fluids to the pulverized tree waste of the pulverizing station.

16. The system according to claim 1 including a magnet station adjacent the output end of the base for removing metallic material from the sheared tree waste.

17. The system according to claim 1 including a wood chip separator disposed between the output end of the support base and the pulverizing station, the wood chip separator adapted to permit passage of wood chips of sheared tree waste having a minimum dimension.

* * * * *